US012669825B2

(12) United States Patent
Qiu

(10) Patent No.: US 12,669,825 B2
(45) Date of Patent: Jun. 30, 2026

(54) TETHER-BASED WIND ESTIMATION

(71) Applicant: Wing Aviation LLC, Palo Alto, CA (US)

(72) Inventor: Ivan Qiu, Redwood City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

(21) Appl. No.: 18/929,561

(22) Filed: Oct. 28, 2024

(65) Prior Publication Data

US 2025/0053175 A1      Feb. 13, 2025

Related U.S. Application Data

(63) Continuation of application No. 17/812,758, filed on Jul. 15, 2022, now Pat. No. 12,164,308.

(51) Int. Cl.
G05D 1/00          (2024.01)
B64D 47/02          (2006.01)
(Continued)

(52) U.S. Cl.
CPC ............. G05D 1/106 (2019.05); B64D 47/02 (2013.01); G05D 1/046 (2013.01); G05D 1/606 (2024.01);
(Continued)

(58) Field of Classification Search
CPC ........ G05D 1/106; G05D 1/046; G05D 1/606; G05D 1/621; G05D 1/46; G05D 1/243;
(Continued)

(56) References Cited

U.S. PATENT DOCUMENTS

| 2,849,805 A | 9/1958 | Kruse |
| 7,546,187 B2 | 6/2009 | Bodin et al. |

(Continued)

FOREIGN PATENT DOCUMENTS

| AU | 2017324649 B2 | 4/2020 |
| EP | 2390670 B1 | 4/2013 |

(Continued)

OTHER PUBLICATIONS

U.S. Pat. No. 12,164,308 B2 Claims (Year: 2024).*
(Continued)

*Primary Examiner* — Nhi Q Bui
(74) *Attorney, Agent, or Firm* — McDonnell Boehnen Hulbert & Berghoff LLP

(57)          ABSTRACT

A method includes causing an aerial vehicle to deploy a tethered component to a particular distance beneath the aerial vehicle by releasing a tether connecting the tethered component to the aerial vehicle. The method also includes obtaining, from a camera connected to the aerial vehicle, image data that represents the tethered component while the tethered component is deployed to the particular distance beneath the aerial vehicle. The method additionally includes determining, based on the image data, a position of the tethered component within the image data. The method further includes determining, based on the position of the tethered component within the image data, a wind vector that represents a wind condition present in an environment of the aerial vehicle. The method yet further includes causing the aerial vehicle to perform an operation based on the wind vector.

20 Claims, 13 Drawing Sheets

(51) Int. Cl.

| | |
|---|---|
| *G05D 1/606* | (2024.01) |
| *G05D 1/617* | (2024.01) |
| *G06F 18/2413* | (2023.01) |
| *G06T 7/70* | (2017.01) |
| *B64U 101/30* | (2023.01) |

(52) U.S. Cl.
CPC ....... *G05D 1/621* (2024.01); *G06F 18/24137* (2023.01); *G06T 7/70* (2017.01); *B64U 2101/30* (2023.01)

(58) Field of Classification Search
CPC ............. G05D 1/667; G05D 2109/254; G05D 2105/285; G05D 2111/10; G06F 18/24137; B64D 47/02; G06T 7/70; G06T 7/73; B64C 39/022; B64C 39/024; B64U 30/20; B64U 50/14; B64U 2101/30; G01W 1/02; G06V 10/766; G06V 20/17
See application file for complete search history.

(56) References Cited

U.S. PATENT DOCUMENTS

| | | | |
|---|---|---|---|
| 8,219,267 | B2 | 7/2012 | Hamke et al. |
| 9,031,719 | B2 | 5/2015 | Hall et al. |
| 9,310,222 | B1 | 4/2016 | Suiter et al. |
| 10,023,323 | B1 | 7/2018 | Roberts et al. |
| 10,909,864 | B2 | 2/2021 | De La Guardia Gonzalez et al. |
| 10,970,855 | B1 * | 4/2021 | Asif .......................... G06T 7/73 |

| | | | |
|---|---|---|---|
| 2016/0005159 | A1 | 1/2016 | Hallamask et al. |
| 2018/0072404 | A1 | 3/2018 | Prager et al. |
| 2018/0072419 | A1 * | 3/2018 | Burgess ................... B64D 1/22 |
| 2019/0094255 | A1 * | 3/2019 | Kereth .................... F03D 17/00 |
| 2019/0354099 | A1 | 11/2019 | Shomin et al. |
| 2020/0324902 | A1 | 10/2020 | Burgess |
| 2020/0353943 | A1 * | 11/2020 | Siddiqui ................... G06T 7/20 |
| 2021/0101664 | A1 | 4/2021 | Nedwed et al. |
| 2021/0190745 | A1 | 6/2021 | Buckingham et al. |
| 2021/0192175 | A1 | 6/2021 | Pineda et al. |
| 2021/0385386 | A1 | 12/2021 | Lunt |
| 2022/0135211 | A1 | 5/2022 | Prager et al. |
| 2022/0146546 | A1 | 5/2022 | Zhang |
| 2023/0084439 | A1 * | 3/2023 | Oshima ................... B64D 1/22 |
| | | | 244/17.23 |

FOREIGN PATENT DOCUMENTS

| | | | |
|---|---|---|---|
| EP | 3324260 B1 | 4/2019 | |
| WO | 2013111429 A1 | 8/2013 | |
| WO | WO-2019158222 A1 * | 8/2019 | ............. G01P 5/001 |

OTHER PUBLICATIONS

International Searching Authority, International Search Report and Written Opinion mailed Nov. 1, 2023, issued in connection with International Patent Application No. PCT/US2023/027425, filed Jul. 11, 2023, 11 pages.

Gunnlaugsson, H.P., et al. "Telltale wind indicator for the Mars Phoenix lander", Journal of Geophysical Research 113 (Jan. 1, 2008) Doi: 10.1029/2007JE003008.

\* cited by examiner

650

654

652

| HORIZONTAL PIXEL COORDINATES | HORIZONTAL WIND VELOCITIES |
|---|---|
| $H_1$ | $W_1$ |
| $H_2$ | $W_2$ |
| $H_3$ | $W_3$ |
| $H_4$ | $W_4$ |
| $H_5$ | $W_5$ |
| $H_6$ | $W_6$ |
| $H_7$ | $W_7$ |
| ... | ... |
| $H_N$ | $W_N$ |

| VERTICAL PIXEL COORDINATES | VERTICAL WIND VELOCITIES |
|---|---|
| $v_1$ | $s_1$ |
| $v_2$ | $s_2$ |
| $v_3$ | $s_3$ |
| $v_4$ | $s_4$ |
| $v_5$ | $s_5$ |
| $v_6$ | $s_6$ |
| $v_7$ | $s_7$ |
| ... | ... |
| $v_N$ | $s_N$ |

Figure 6C

TETHER-BASED WIND ESTIMATION

CROSS-REFERENCE TO RELATED APPLICATIONS

This application is a continuation of and claims priority to U.S. patent application Ser. No. 17/812,758, filed Jul. 15, 2022, and titled "Tether-Based Wind Estimation," which is hereby incorporated by reference as if fully set forth in this description.

BACKGROUND

An unmanned vehicle is a vehicle capable of travel without a physically-present human operator. An unmanned vehicle may operate in a remote-control mode, in an autonomous mode, or in a partially autonomous mode. Accordingly, the unmanned vehicle may be referred to as an autonomous vehicle.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

An aerial vehicle operating in an environment might be exposed to different environmental conditions, including wind that may exert forces on the aerial vehicle. Thus, it may be beneficial to determine a wind vector representing, for example, a speed and direction of the wind acting upon the aerial vehicle. The wind vector may allow the aerial vehicle to operate in a manner that compensates for, accommodates, and/or coordinates with the wind. The aerial vehicle can include a camera attached to the aerial vehicle and a tether configured to allow a tethered component, such as a payload coupling apparatus, a payload, and/or other tethered object, to be retracted towards and/or lowered from the aerial vehicle.

The wind vector may be determined by deploying the tethered component beneath the aerial vehicle, and capturing, using the camera, image data that represents a position of the tethered component relative to the aerial vehicle. When wind is present in the environment, the tethered component may be displaced by the wind, and the position of the tethered component within the image data may thus be indicative of the wind vector. In one example, a physics-based model may be used to determine the wind vector based on (i) a position of the tethered component within the image data and (ii) a reference position of the tethered component that correspond to windless conditions. In another example, a predetermined mapping (e.g., a look-up table and/or a regression model) may be used to determine the wind vector based on the position of the tethered component within the image data. The aerial vehicle may perform one or more operations based on the wind vector.

In a first example embodiment, a method may include causing an aerial vehicle to deploy a tethered component to a particular distance beneath the aerial vehicle by releasing a tether connecting the tethered component to the aerial vehicle. The method may also include obtaining, from a camera connected to the aerial vehicle, image data that represents the tethered component while the tethered component is deployed to the particular distance beneath the aerial vehicle. The method may additionally include determining, based on the image data, a position of the tethered component within the image data. The method may further include determining, based on the position of the tethered component within the image data, a wind vector that represents a wind condition present in an environment of the aerial vehicle. The method may yet further include causing the aerial vehicle to perform an operation based on the wind vector.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B illustrates a table that maps pixel coordinates to wind speed, in accordance with examples described herein.

FIG. 6C illustrates a table that maps pixel coordinates to wind speed, in accordance with examples described herein.

DETAILED DESCRIPTION

Figure 1A:
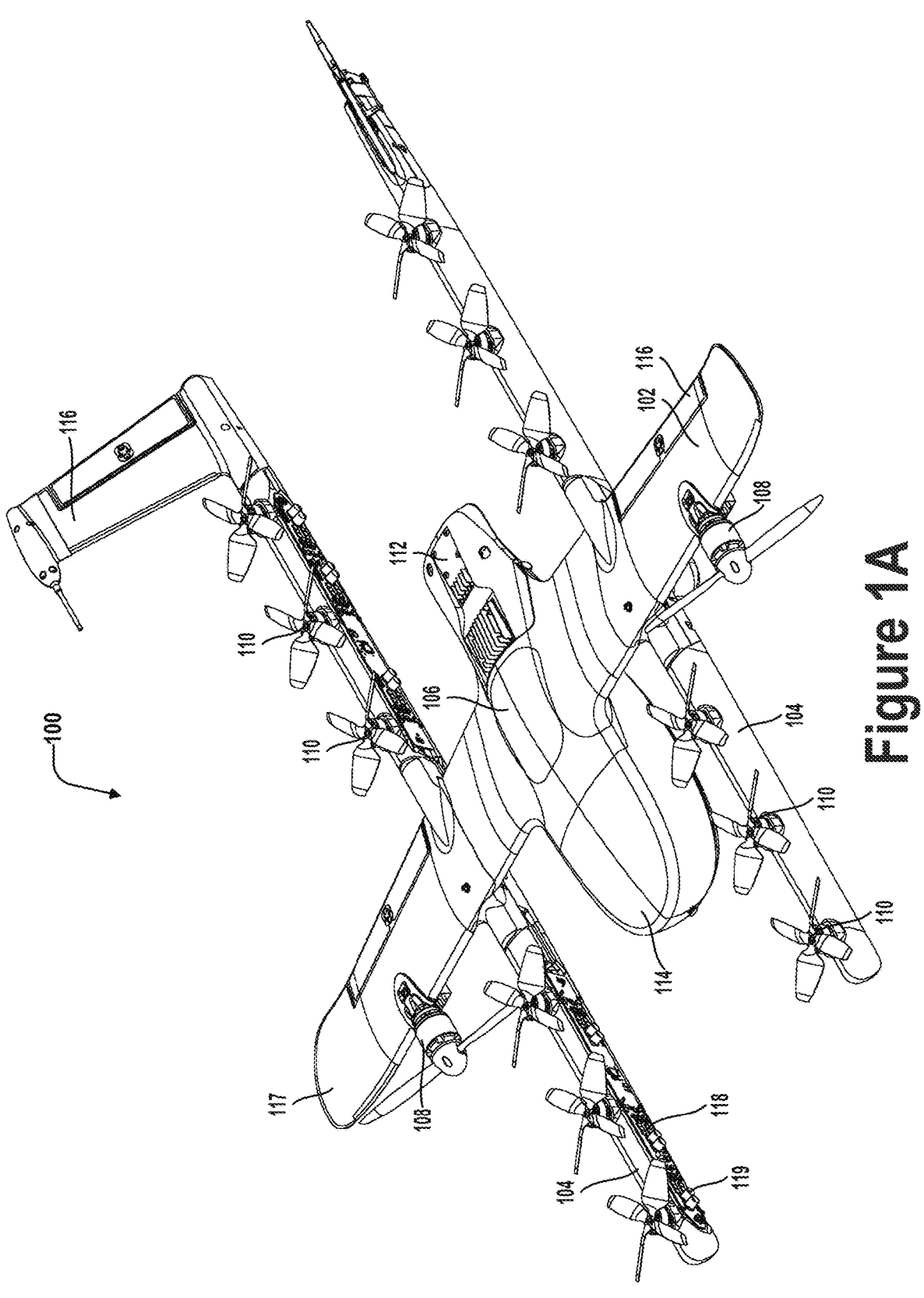
FIG. 1A illustrates an unmanned aerial vehicle, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

An aerial vehicle may be configured to use a tethered component to determine a wind vector representing a speed, acceleration, and/or direction of wind present in an environment of the aerial vehicle. A tether may connect the tethered component to the aerial vehicle. The tethered component may include a component used in connection with pick-up and/or drop-off of a payload (e.g., a payload coupling apparatus and/or the payload itself), and/or a component deployed specifically for wind measurement and independently of payload pick-up and/or drop-off (e.g., an object with known/predetermined physical properties). The aerial vehicle may be configured to extend/deploy the tether to lower the tethered component from the aerial vehicle, and retract the tether to lift the tethered component towards the aerial vehicle. The aerial vehicle may also include a camera connected to the aerial vehicle and configured to capture image data that represents the tethered component while deployed beneath the aerial vehicle.

The aerial vehicle may deploy the tethered component to a particular distance beneath the aerial vehicle, thus allowing any wind present in an environment of the aerial vehicle to act on the tethered component. While the tethered component is deployed to the particular distance, the aerial vehicle may attempt to hover in a fixed location relative to the environment, thus allowing the wind to displace the tethered component relative to the aerial vehicle.

In the absence of wind, the tether and the tethered component may form an approximately vertical line beneath the aerial vehicle as the tethered component hangs beneath the aerial vehicle. When wind is present in the environment, the tethered component may be displaced horizontally and/or vertically relative to where the tethered component would be in the absence of wind. This wind-induced horizontal displacement of the tethered component may be represented in image data captured by the camera. A magnitude of the wind-induced horizontal displacement may be indicative of a magnitude of the wind speed represented by the wind vector, while a direction of the wind-induced horizontal displacement may be indicative of a direction of the wind vector. In some cases, a sequence of wind speed vectors determined based on a sequence of image data captured over time may be used to determine a magnitude and direction of acceleration of the wind over time.

Thus, the wind vector may be determined based on a position at which the tethered component is detected within the image data. For example, the wind vector may be determined based on a difference between (i) a reference position within the image data expected to represent the tethered component in the absence of wind and (ii) the position at which the tethered component is detected within the image data when wind is present. In one implementation, the wind vector may be determined by a physics-based model based on the position of the tethered component within the image data, the reference position, the particular distance to which the tethered component is deployed, and/or other physical properties of the tethered component, the tether, the camera, and/or other components of the aerial vehicle.

In another implementation, the wind vector may be determined using a predetermined mapping, such as a look-up table or a mathematical model, that relates a plurality of possible positions of the tethered component within the image data to a plurality of possible wind speeds and/or wind directions. The mapping may be determined based on empirical collection of data representing displacements of the tethered component at different wind speeds and/or a simulation of a response of the tethered component to different wind speeds. In some cases, the mapping may be specific to and/or conditioned on the deployed tether length, the arrangement of the tether and camera on the aerial vehicle, and/or other physical properties of the aerial vehicle and/or components thereof.

II. EXAMPLE AERIAL VEHICLES

Herein, the terms "unmanned aerial system" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
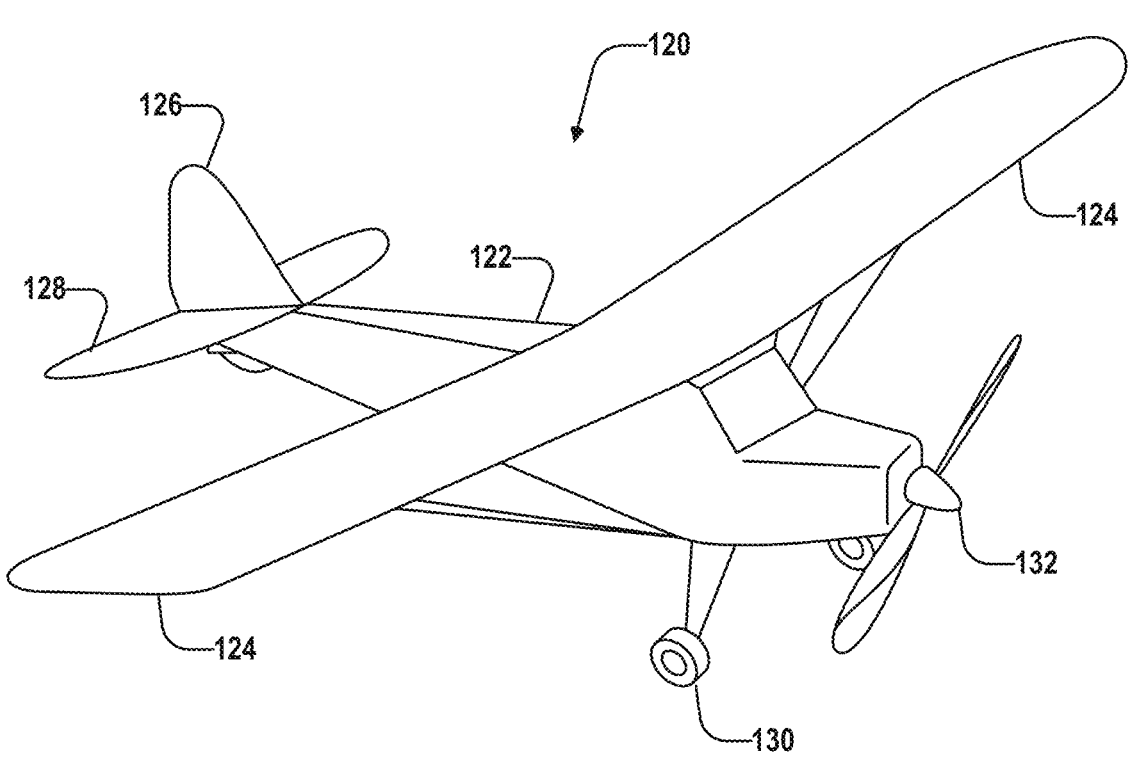
FIG. 1B illustrates an unmanned aerial vehicle, in accordance with examples described herein.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
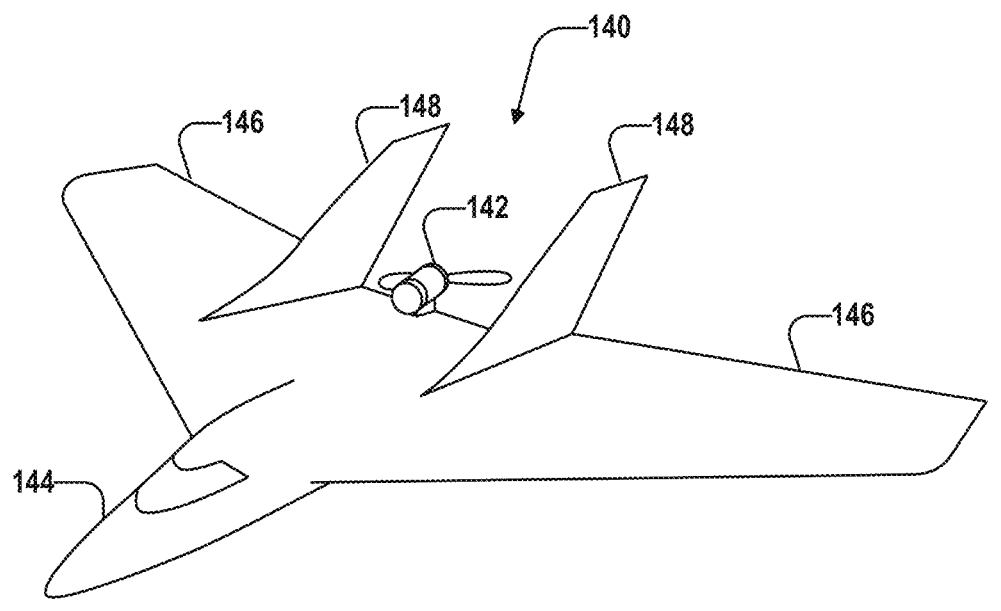
FIG. 1C illustrates an unmanned aerial vehicle, in accordance with examples described herein.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
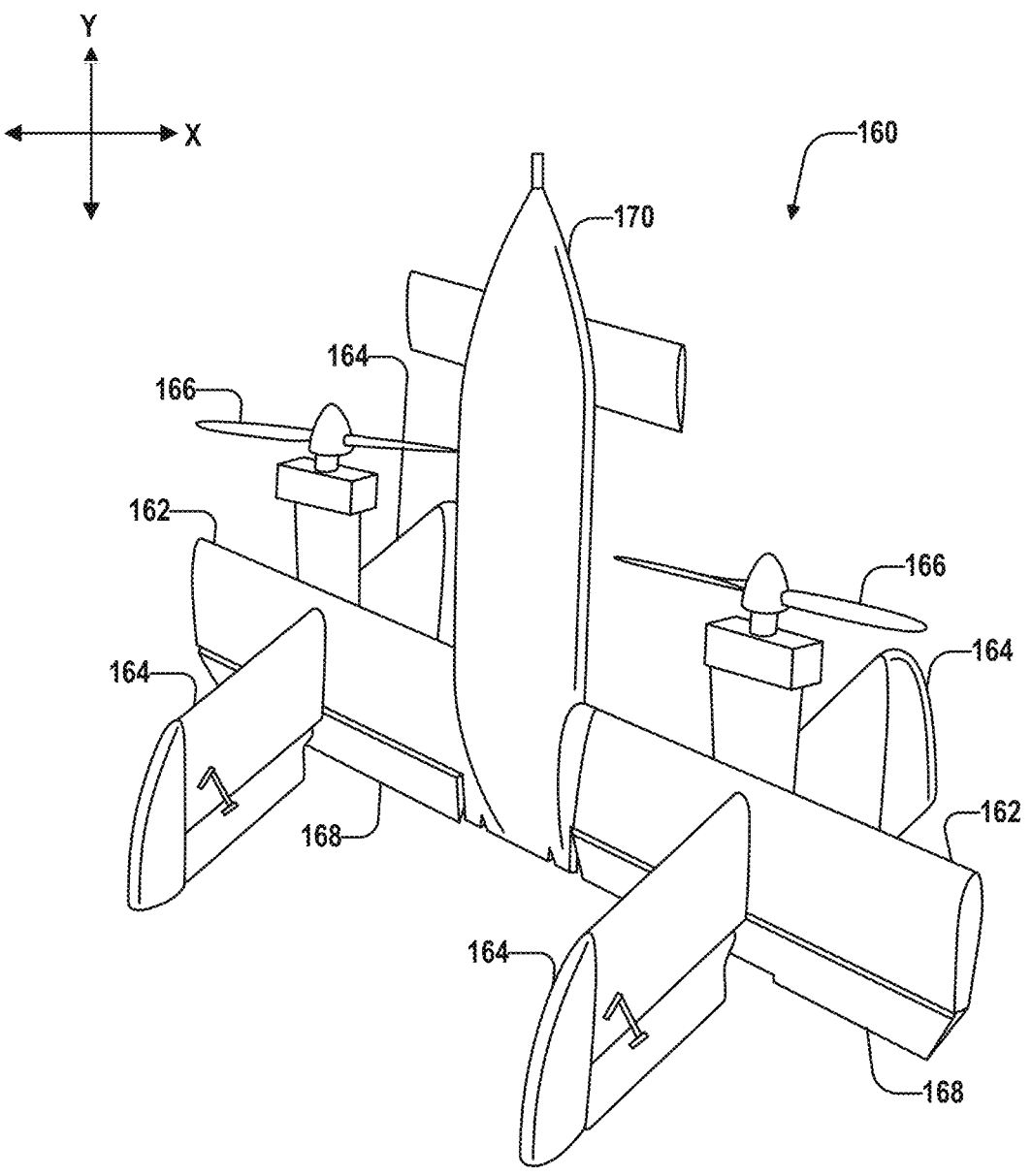
FIG. 1D illustrates an unmanned aerial vehicle, in accordance with examples described herein.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
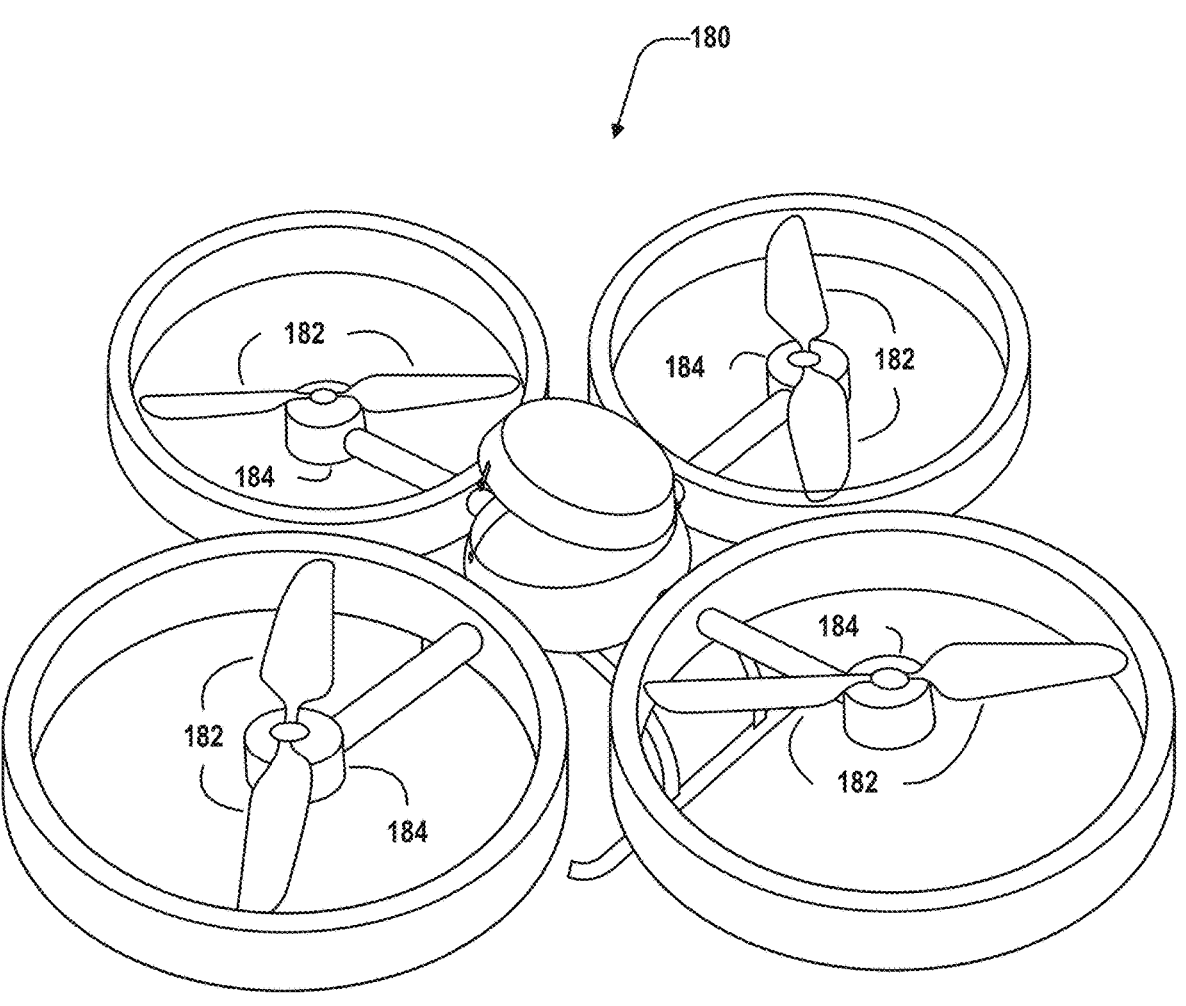
FIG. 1E illustrates an unmanned aerial vehicle, in accordance with examples described herein.

As noted above, some embodiments may involve other types of UAVs, in addition to or in the alternative to fixed-wing UAVs. For instance, FIG. 1E shows an example of rotorcraft 180 that is commonly referred to as a multi-copter. Multicopter 180 may also be referred to as a quad-copter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. EXAMPLE UAV COMPONENTS

Figure 2:
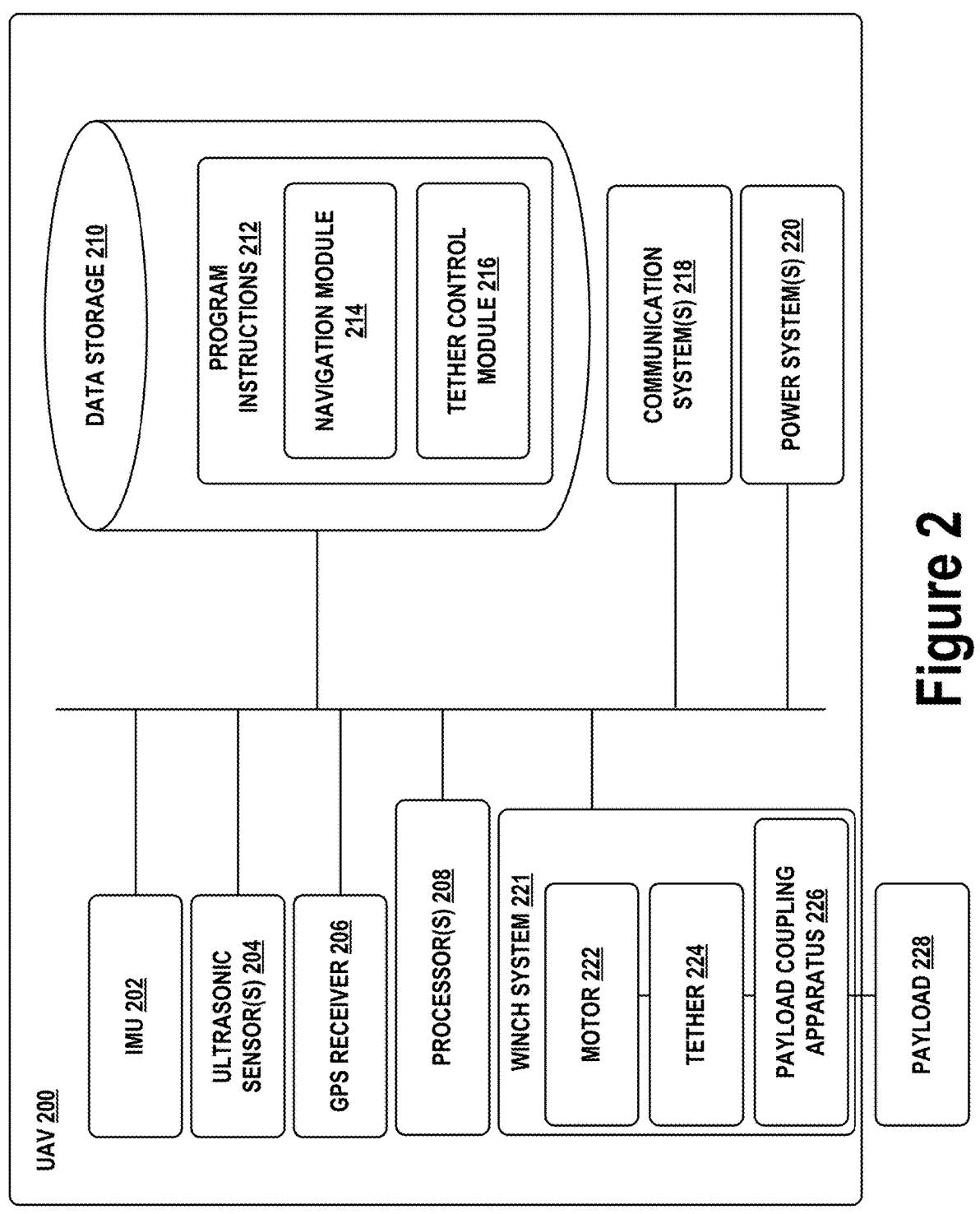
FIG. 2 illustrates components of an unmanned aerial system, in accordance with examples described herein.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifics a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on a swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

IV. EXAMPLE UAV DEPLOYMENT SYSTEMS

Figure 3:
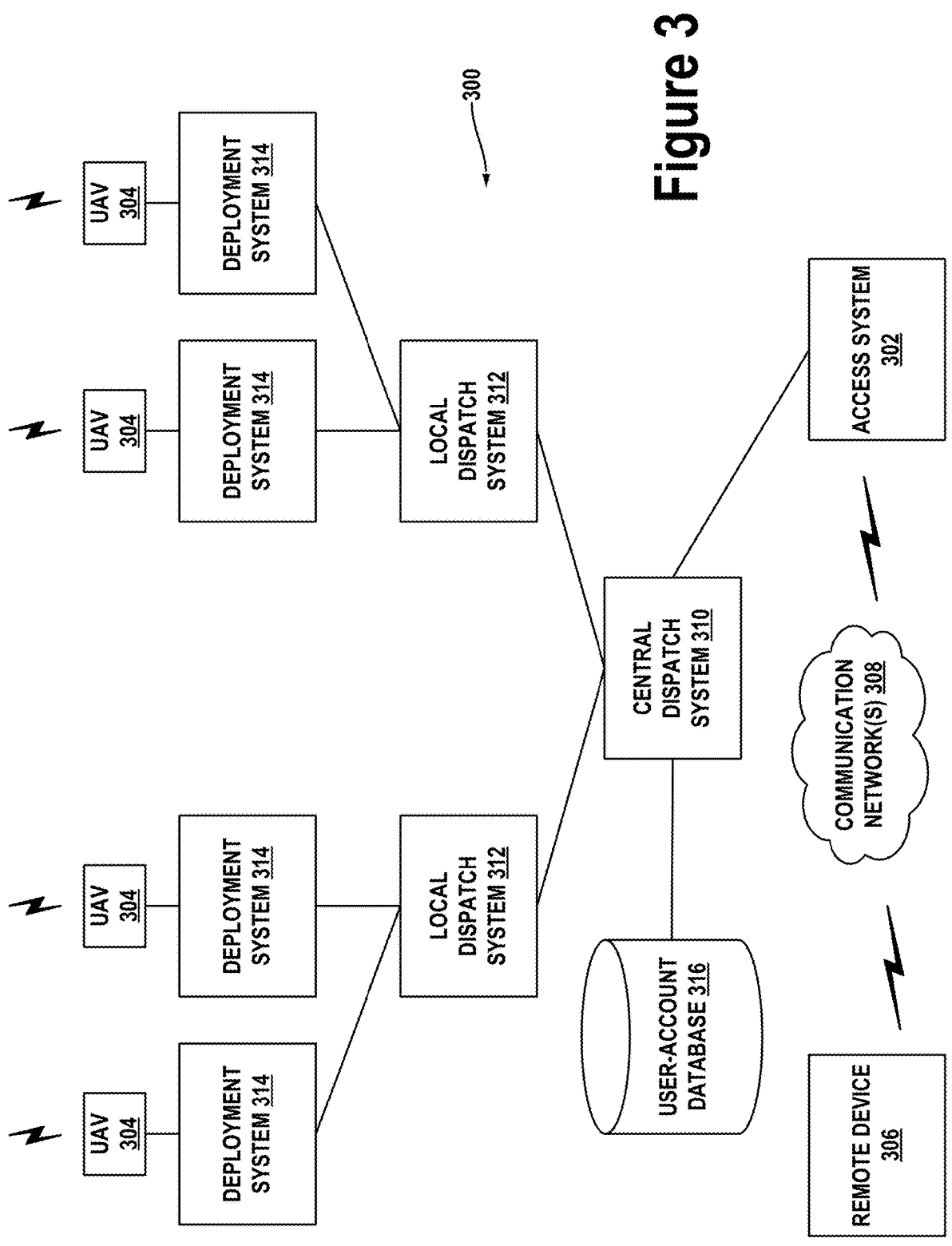
FIG. 3 is a block diagram illustrating a distributed UAV system, in accordance with examples described herein.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Deployment system 314 could also include other structures and/or systems to assist and/or facilitate UAV landing processes.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

V. ADDITIONAL EXAMPLE AERIAL VEHICLE

Figure 4:
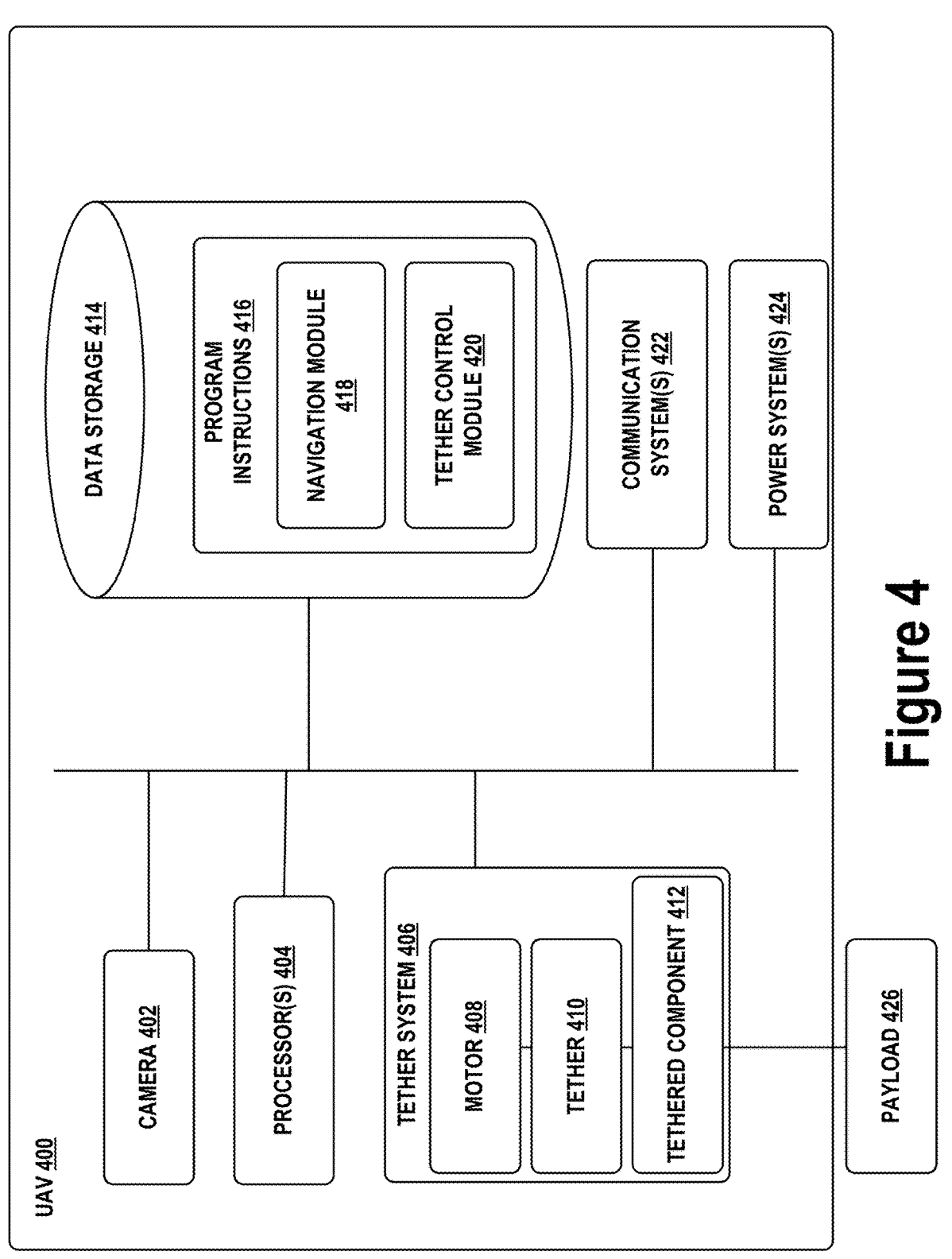
FIG. 4 illustrates components of an unmanned aerial system, in accordance with examples described herein.

FIG. 4 is a simplified block diagram illustrating components of UAV 400, according to an example embodiment. UAV 400 may take the form of, or be similar in form to, one of UAVs 100, 120, 140, 160, and 180 described in reference to FIGS. 1A-1E and can additionally include any components of UAV 200. However, UAV 400 may also take other forms.

UAV 400 may include various types of sensors, and may include a computing system configured to provide the functionality described herein. UAV 400 includes camera 402, which may be configured to generate image data that includes one or more image frames (e.g., still images and/or a video). Camera 402 may be a DSLR camera, a mirrorless camera, a compact camera, a bridge camera, and/or an infrared camera, among other possibilities. In some embodiments, UAV 400 may include multiple instances of camera 402 and/or variations thereof.

UAV 400 may also include processor(s) 404, which may be the same as or similar to processor(s) 208 of UAV 200.

Processor(s) 404 can be configured to execute computer-readable program instructions 416 that are stored in data storage 414 and are executable to provide the functionality of UAV 400. Data storage 414 may be the same as or similar to data storage 210.

Program instructions 416 may include navigation module 418, which may be the same as or similar to navigation module 214, and tether control module 420, which may be the same as or similar to tether control module 216. UAV 400 may also include communication system(s) 422, which may be the same as or similar to communication system(s) 218, and power system(s) 424, which may be the same as or similar to power system(s) 220. In some embodiments, some of the operations described herein may be performed by one or more server devices on behalf of UAV 400.

UAV 400 may further include a tether system 406 that includes motor 408, tether 410, and a tethered component 412. Payload 426 may be coupled to tether system 406. Tether system 406 may be the same as or similar to winch system 221, although other mechanisms for extending and retracting tether 410 are possible. In some embodiments, tethered component 412 may be a payload coupling apparatus, such as payload coupling apparatus 226. In other embodiments, tethered component 412 may be an object of known aerodynamic and/or physical properties that may be deployed for the purpose of obtaining tether-based wind measurements, and might not be used for attaching payload 426. In some cases, payload 426 may be considered a subset of tethered component 412. Thus, the phrase "tethered component" may be used herein to refer to, for example, tethered component 412 and/or payload 426.

In some embodiments, tethered component 412 may be coated with a reflective material (e.g., reflective paint), which may allow tethered component 412 to reflect light incident on tethered component 412. Because of the reflective material, tethered component 412 may be more easily detected within image data generated by camera 402. For example, the reflective material may increase the amount of light reflected from the tethered component 412 towards camera 402 to increase a visibility of tethered component 412 within the image data.

In some embodiments, tethered component 412 may include a light emitter device. The light emitter device may be configured to emit light of a frequency that is detectable by camera 402, and may be positioned on tethered component 412 such that the light emitted therefrom is directed at camera 402. Camera 402 may be configured to capture the image data while the light emitter of tethered component 412 emits light towards camera 402, thus facilitating detection of tethered component 412 within the image data.

In some embodiments, UAV 400 may include a light emitter device. The light emitter device may be configured to emit light toward tethered component 412, and the emitted light may be reflected from tethered component 412 towards camera 402. Camera 402 may be configured to capture the image data while the light emitter device emits light toward tethered component 412, thus facilitating detection of tethered component 412 within the image data.

In some embodiments, tethered component 412 may include a plurality of perforations. The perforations may reduce the mass of tethered component 412 and the area of tethered component 412 exposed to the wind. A tethered component with perforations may, when exposed to a given wind speed, be displaced less than the same tethered component without perforations. Accordingly, tethered component 412 with perforations may remain within a field of view of camera 502 at higher wind speed than tethered component 412 without perforations, thus allowing for measurement of higher wind speeds.

VI. EXAMPLE TETHER-BASED WIND MEASUREMENTS

Figure 5A:
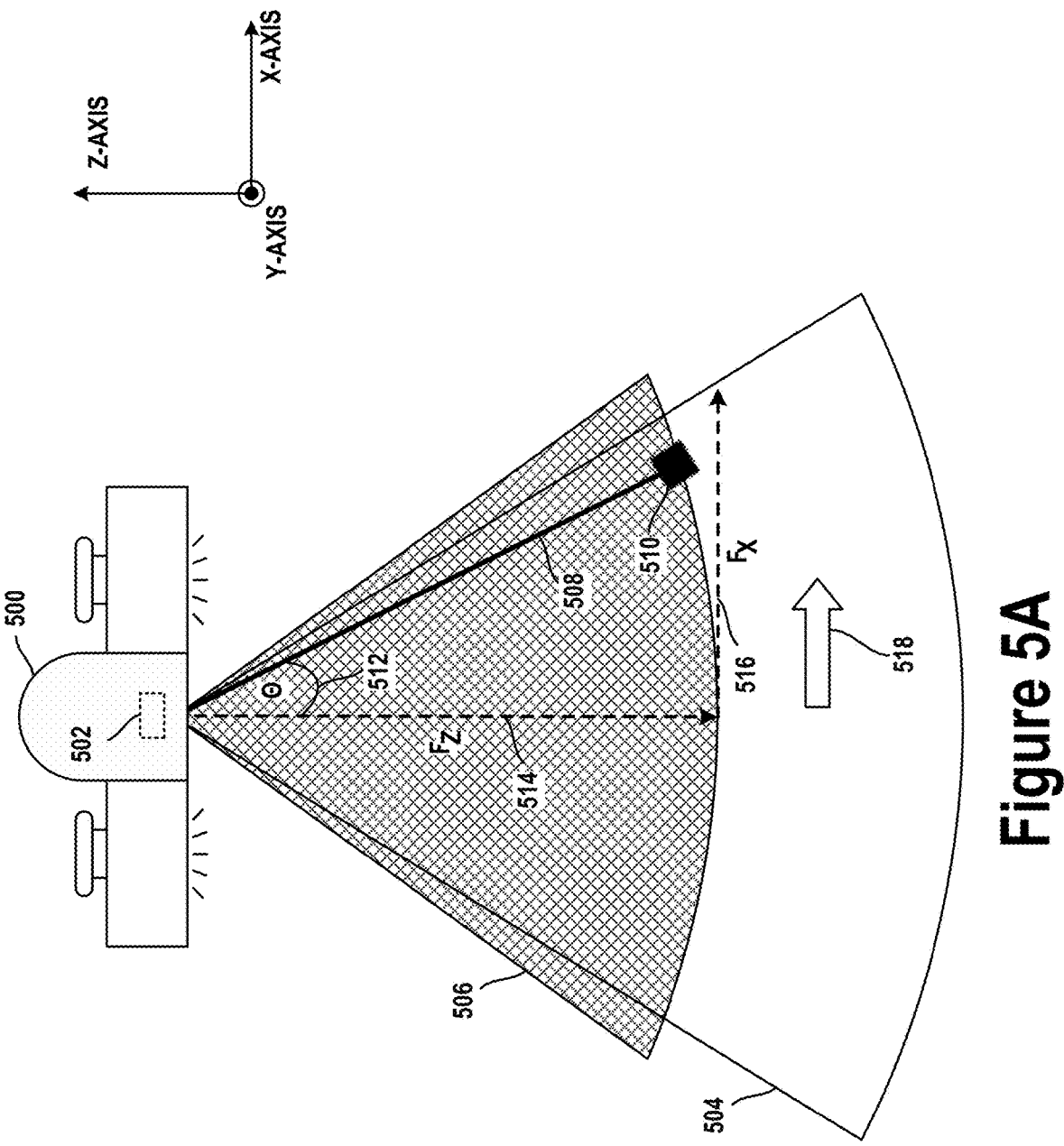
FIG. 5A illustrates a field of view of a camera on an aerial vehicle, in accordance with examples described herein.

FIG. 5A illustrates an example UAV 500, which may represent UAV 100, 120, 140, 160, 180, 200, 304, and/or 400, among other possibilities. UAV 500 may be alternatively referred to as an aerial vehicle. UAV 500 may include camera 502, tether 508, and tethered component 510, which may be the same as or similar to camera 402, tether 410, and tethered component 412 of UAV 400. Camera 502 may have a field of view 504 extending beneath UAV 500. Position range 506 indicates a range of angular positions to which tethered component 510 may be displaced due to various wind speeds directed along the x-axis. Tethered component 510 may be visible to camera 502 while tethered component 510 is positioned within the field of view 504 of camera 502.

FIG. 5A illustrates a cross-section in the x-z plane of field of view 504 and position range 506. It is to be understood that each of field of view 504 and position range 506 represents a corresponding three-dimensional conical volume. Any discussion of properties in the x-z plane could equally apply to commensurate properties in the y-z plane. For example, an x-component of wind 518 is shown in FIG. 5A, and it is to be understood that wind 518 may also have a y-component.

In order to use tethered component 510 to determine a wind vector representing properties of wind 518 present in an environment of UAV 500, UAV 500 may be configured to deploy tethered component 510 to a particular distance beneath UAV 500 by releasing tether 508 by a corresponding length. The particular distance to which tethered component 510 is deployed may be selected based on a size of tethered component 510 so that tethered component 510 is detectable within image data captured by camera 502. For instance, the particular distance may be selected such that tethered component 510, when deployed to the particular distance, occupies at least a predetermined number of pixels within the image data to allow for reliable detection of tethered component 510. Thus, detection of tethered component 510 within the image data may favor shorter deployed lengths of tether 508.

In some embodiments, the particular distance beneath UAV 500 to which tethered component 510 is deployed may be selected based a field of view 504 of camera 502 so that tethered component 510 is detectable within the image data generated by camera 502. Specifically, the particular distance may be selected such that tethered component 510, when displaced by the wind at the particular distance, is expected to be positioned within field of view 504 of camera 502. Thus, positioning of tethered component 510 within the field of view of camera 502 may favor longer deployed lengths of tether 508.

In some embodiments, the particular distance beneath UAV 500 to which tethered component 510 is deployed may be selected based on an extent of downwash generated one or more propellers of UAV 500, such that the downwash does not prohibitively interfere with a wind-induced displacement of tethered component 510. For example, if too much downwash is acting on tethered component 510, the position of tethered component may be affected by both the downwash and the wind. Thus, the position of tethered component 510 within the image data may represent the effects of both the downwash and the wind, and therefore might interfere with an accurate determination of the wind vector when the effects of the downwash and the wind are not separable. Thus, reduction of downwash on tethered component 510 may favor longer deployed lengths of tether 508.

In some embodiments, the particular distance beneath UAV 500 to which tethered component 510 is deployed may be selected based on damping properties of tethered component 510 at the particular distance below UAV 500. For example, larger deployed length of tether 508 may provide higher damping for tethered component 510, which may facilitate guidance and/or control of tethered component 510. Thus, increased damping of tethered component 510 may favor longer deployed lengths of tether 508.

In addition, the particular distance beneath UAV 500 to which tethered component 510 is deployed may be selected based on a likelihood of tethered component 510, when deployed at the particular distance, striking a propeller or other part of UAV 500 during movements of UAV 500. For example, a short deployed length of tether 508 could cause tethered component 510 and/or tether 508 to interfere with (e.g., strike, wrap around, etc.) UAV 500, such as by getting wrapped up in propellers on UAV 500, thereby causing UAV 500 to fail. Thus, avoidance of collisions between UAV 500 and tethered component 510 may favor longer deployed lengths of tether 508.

Accordingly, in some cases, the particular distance beneath UAV 500 to which tethered component 510 is deployed, and thus the deployed length of tether 508, may be selected based on each of the considerations outlined above, such that tethered component 510 is usable to determine the wind vector and allows UAV 500 to operate safely.

While tethered component 510 is deployed to the particular distance beneath UAV 500, tethered component 510 may be displaced by wind 518 present in the environment. Camera 502 may capture image data that represents tethered component 510 while tethered component 510 is displaced by the wind.

In some embodiments, UAV 500 may be configured to attempt to hover in a fixed location relative to a ground surface while the image data is captured by camera 502. Thus, a position of UAV 500 relative to the ground surface may be unaffected by wind 518 due to propellers of UAV 500 operating to counteract wind 518. However, the position of tether component 510 relative to UAV 500 may be affected by wind 518. Thus, since the image data generated by camera 502 represents tethered component 510 in a reference frame of UAV 500, a position of tethered component 510 within the image data may be indicative of the speed and direction of the wind.

In some embodiments, both UAV 500 and tethered component 510 may be displaced by wind 518. However, due to differences in the aerodynamic properties of UAV 500 and tethered component 510, each may experience a different force as a result of wind 518. Thus, tethered component 510 may nevertheless be displaced relative to UAV 500, and this displacement, as represented in the image data, may be used to determine the wind vector.

A position of tethered component 510 within the image data may be determined and used to determine the wind vector. In some embodiments, the position of tethered component 510 within the image data may include a centroid of a group of pixels representing tethered component 510 within the image data. Based on the position of tethered component 510 within the image data, a wind vector that represents a speed, acceleration, and/or direction of wind present in the environment of UAV 500 can be determined.

In some cases, a plurality of wind vectors maybe determined that represent properties of the wind over time based on image data captured over time.

In one example, in order to determine the wind vector, a pixel distance may be determined between (i) the position of tethered component 510 within the image data captured by camera 502 and (ii) a reference position within the image data. The reference position may be a location within the image data that is expected to represent tethered component 510 in the absence of wind and while UAV 500 is attempting to hover in a fixed location. For instance, in FIG. 5A, if tethered component 510 were not acted on by any wind, tethered component 510 would be expected to hang under UAV 500, with tether 508 forming an approximately vertical line (i.e., parallel to the z-axis) coincident with a point on UAV 500 at which tether 508 connects thereto. This "neutral," or reference, position of tether 508 may approximately correspond to line 514.

When the optical center of camera 502 and the connection point of tether 508 to UAV 500 are sufficiently close to each other (e.g., within a threshold distance of one another), the wind vector can be determined using the following model. When tethered component 510 is acted on by a horizontal force due to the wind, tethered component 510 may be moved from its neutral position to a wind-induced position (e.g., as shown in FIG. 5A). The displacement of tethered component 510 from the neutral position to the wind-induced position may have a first horizontal displacement component along the x-axis, a second horizontal displacement component along the y-axis, and/or a vertical displacement component along the z-axis. The wind-induced position of tethered component 510 along the x-axis and/or the y-axis may be determined in pixels based on the image data captured by camera 502.

Angle 512 may be formed between (i) tethered component 510 while at the wind-induced position and (ii) vertical line 514 representing the reference position. Angle 512 may alternatively be referred to using the symbol θ. Angle 512 corresponds to the first horizontal displacement along the x-axis, and is thus caused by a component of wind 518 directed along the x-axis. Accordingly, another wind-induced angle (not shown) corresponding to the second horizontal displacement along the y-axis may be caused by a component of wind 518 directed along the y-axis. The wind vector may be determined based on the x-axis component and the y-axis component of wind 518.

Angle 512 may be determined based on a position of tethered component 510, as represented within the image data. Field of view 504 of camera 502 may span an angle $2\theta_{MAX}$ about a center of the arc representing field of view 504 (e.g., $-\theta_{MAX}$ to the left of line 514 and $+\theta_{MAX}$ to the right of line 514). When projected onto the image sensor of camera 502, field of view 504 may be represented by $2D_{MAX}$ pixels along the x-axis (i.e., the image sensor may have a width of $2D_{MAX}$ along the x-axis). Therefore, pixels at horizontal edge positions within the image data may represent tethered component 510 when tethered component 510 is displaced to a maximum detectable angle $\theta_{MAX}$ between tethered component 510 and the neutral position at line 514. Thus, when angle 512 is less than or equal to the maximum angle $\theta_{MAX}$, the tethered component 510 may be within field of view 504 of camera 502 and angle 512 can be determined.

Specifically, image data generated by camera 502 can be used to determine a pixel distance d that represents a displacement along the x-axis of tethered component 510 relative to the neutral position. Therefore, angle 512 can be determined by the equation $$\theta = \frac{d \cdot \theta_{MAX}}{D_{MAX}}$$

where d, $\theta_{MAX}$, and $D_{MAX}$ represent the physical quantities as defined above. In some implementations, the pixel distance d may be determined after the image data has been processed to correct for lens distortion, lighting conditions, and/or other image artifacts.

The velocity of wind 518 along the x-axis can be determined based on angle 512. A force acting on tethered component 510 due to the acceleration of gravity along the z-axis (i.e., a weight of tethered component 510) and may be expressed as $F_z$ and represented using line 514 in FIG. 5A. $F_z$ can be expressed as $F_z$=ma, where m represents a mass of tethered component 510 and a represents an acceleration of tethered component 510 due to gravity along the z-axis.

A drag force due to drag on tethered component 510 caused by wind 518 may be directed along the x-axis and/or the y-axis. An x-component of the drag force acting along the x-axis may be expressed as $F_x$ and represented using line 516 in FIG. 5A. $F_x$ can be expressed as $$F_x = \frac{1}{2}\rho v_x^2 C_d A,$$

where $\rho$ represents a mass density of the fluid medium through which tethered component 510 moves (e.g., the air in the environment), $v_x$ represents the velocity of wind 518 along the x-axis and relative to tethered component 510, $C_d$ represents a coefficient of drag of tethered component 510, and A represents a surface area of tethered component 510 that faces the wind (e.g., the projected area of tethered component 510 onto a plane having a normal vector parallel to the x-axis). Therefore, $$\tan(\theta) = \frac{F_x}{F_z},$$

and the velocity of wind 518 can be expressed as $$v_x = \sqrt{\frac{\tan(\theta)2ma}{\rho C_d A}}.$$

A commensurate calculation may be performed with respect to the y-axis to determine a velocity $v_y$ of wind 518 directed along the y-axis.

A magnitude of a velocity of wind 518 may be determined as described above, while a direction of wind 518 may be determined based on a direction in which tethered component 510 is displaced relative to the reference position. For example, FIG. 5A illustrates tethered component being displaced to the right of line 514, thus indicating that wind 518 is directed towards the right. The x-component and the y-component of wind 518 may be combined to determine a total speed and direction of wind 518 using vector arithmetic. For example, the x-component vector of wind 518 may be added to the y-component vector of wind 518 to determine a total wind vector representing wind 518.

UAV 500 can perform operations based on the wind vector representing wind 518. For example, UAV 500 can adjust the force exerted by its propellers in one or more directions to compensate for and/or operate in coordination with the wind forces acting on UAV 500. In some cases, UAV 500 could adjust the forces exerted by its propellers in order to compensate for wind 518 while attempting to hover in a fixed location. In other cases, UAV 500 could adjust the forces exerted by its propellers in order to change a position or an orientation of UAV 500 in the environment, such as by translating along the x-axis and/or the y-axis and/or by rotating along the z-axis, the y-axis, and/or the x-axis.

In some embodiments, the image data generated by camera 502 may include a plurality of images captured at a plurality of different times. As such, one or more wind vectors representing wind 518 may be determined based on a corresponding location of tethered component 510 within each respective image of the plurality of images captured by camera 502. For example, the location of tethered component 510 within the image data may be based on an average (e.g., weighted average, moving average, etc.) of the corresponding location in each of the plurality of images. That is, each wind vector may be determined based on a corresponding plurality of images, which may result in a wind vector that is more accurate and/or more immune to noise.

In some embodiments, the tether-based wind measurement may be combined with other sources of wind measurement to determine a fused wind vector. For instance, the fused wind vector may be generated by a model configured to combine information from the tether-based wind measurement and one or more other wind measurements from one or more other sensors. For example, the one or more other sensors could include an anemometer, a wind vane, a wind gauge, or the like. The model configured to generate the fused wind vector could include a machine learning model (e.g., a neural network) and/or a Kalman filter, among other possibilities.

Figure 5B:
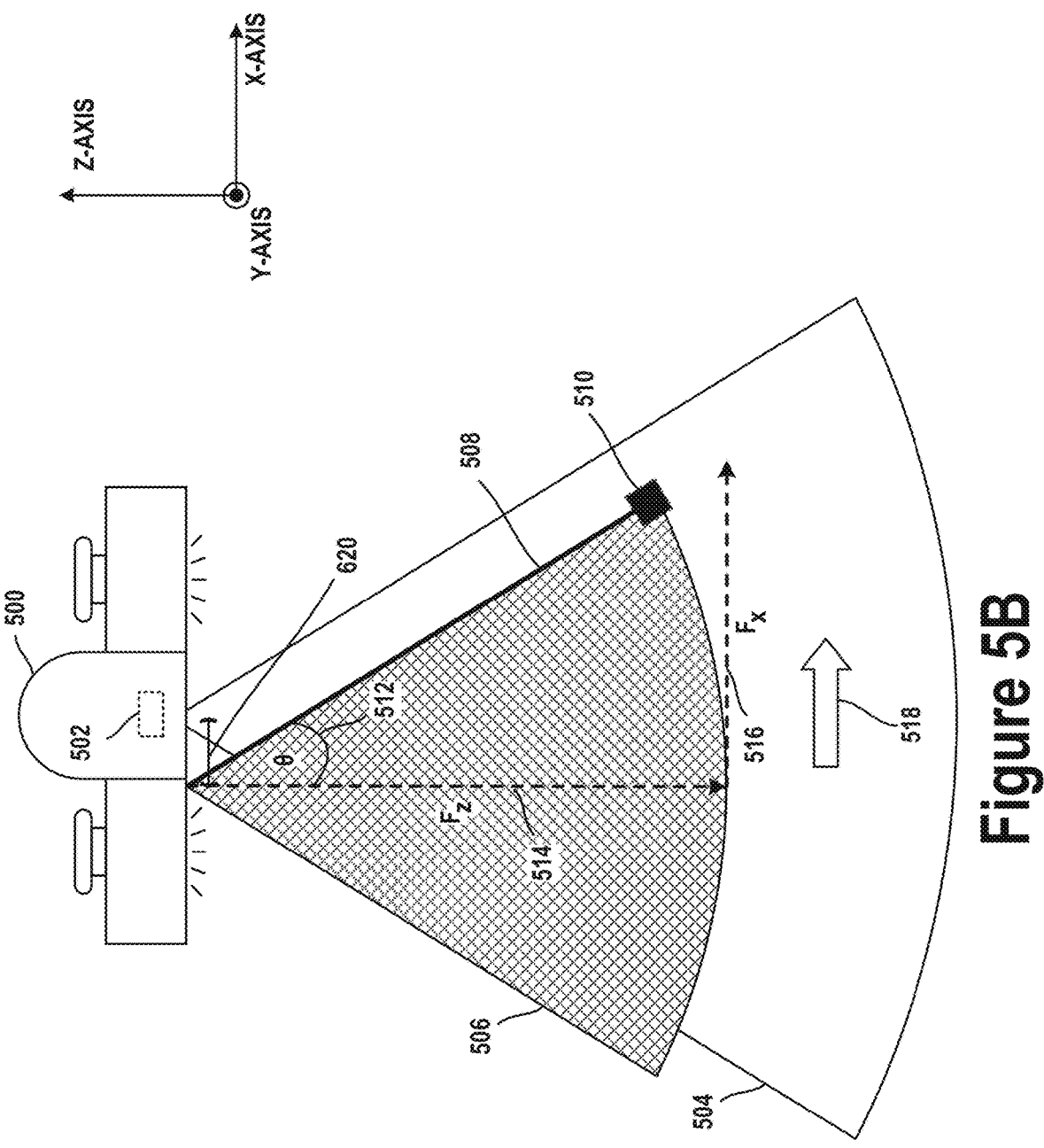
FIG. 5B illustrates a field of view of a camera on an aerial vehicle, in accordance with examples described herein.

FIG. 5B illustrates an alternative embodiment of UAV 500 in which the optical center of camera 502 and the connection point of tether 508 to UAV 500 are spaced apart by distance 620. Thus, line 514 is shifted to the left by distance 620 relative to where line 514 is in FIG. 5A. When distance 620 is relatively large (e.g., more than a few centimeters), an assumption that position range 506 and field of view 504 are defined about approximately the same axis/center may result in an inaccurate wind vector determination. Specifically, when distance 620 is relatively large, angle 512 might not be accurately modeled by the equation $$\theta = \frac{d \cdot \theta_M}{D_M},$$

as discussed above.

Figure 6A:
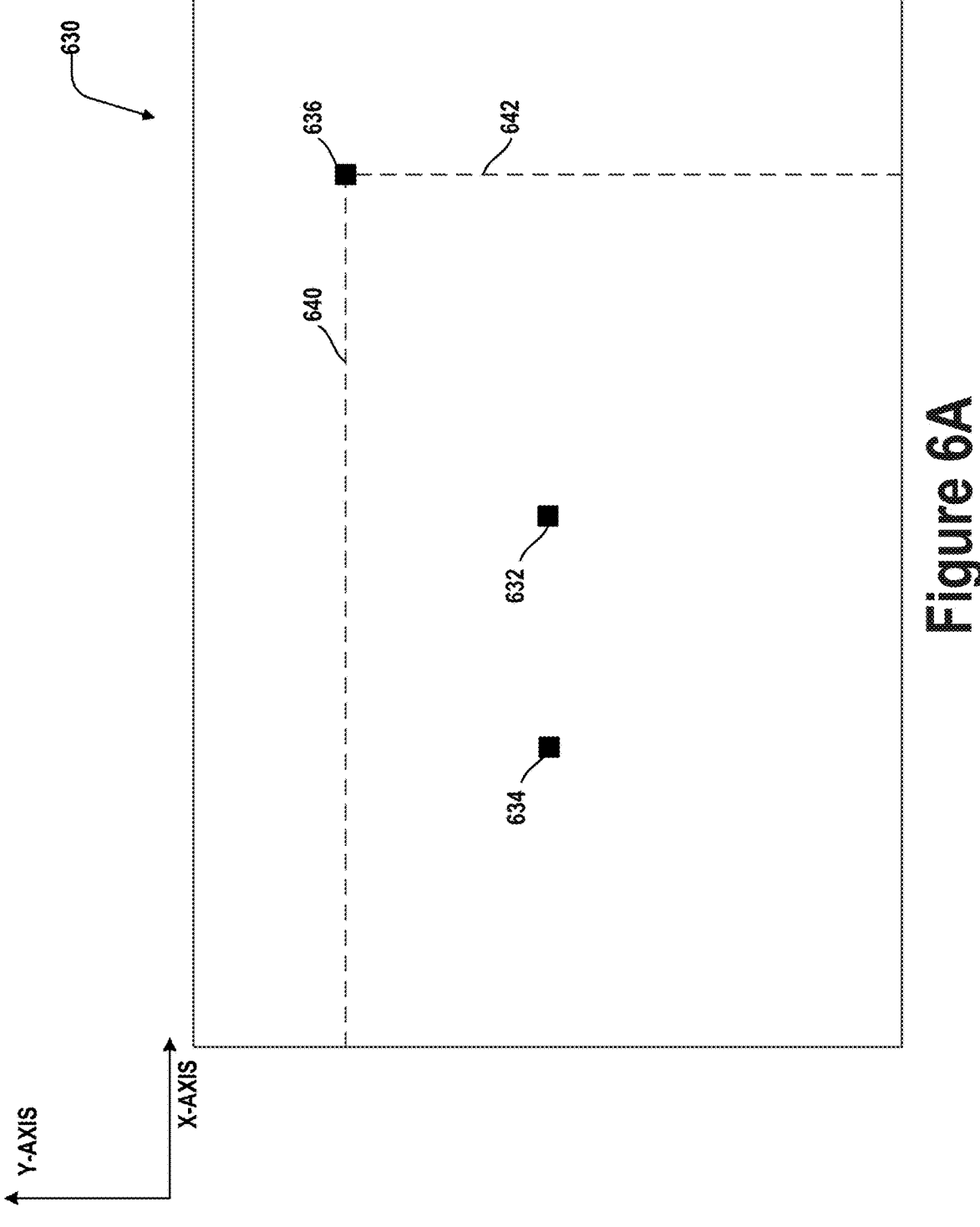
FIG. 6A illustrates image data captured by a camera on an aerial vehicle, in accordance with examples described herein.

Accordingly, in some implementations, angle 512 may instead be modeled by the equation $\theta = \sin^{-1}(s_x/l)$, where $s_x$ represents a physical distance between (i) a location within the image data at which tethered component 510 is detected (e.g., pixel 636, as shown in and discussed with respect to FIG. 6A) and (ii) the reference location within the image data (e.g., pixel 634, as shown in and discussed with respect to FIG. 6A). The physical distance $s_x$ may be expressed as $s_x = k(l)(x_p - x_n)$, where k(l) is a function configured to generate a value corresponding to length l that maps/scales pixel distances to physical distances, $x_p$ is the x-coordinate within the image data of the pixel at which tethered component 510 is detected, and $x_n$ is the x-coordinate within the image data of the reference position. The function k(l) may correspond to and/or be based on parameters of camera 502, including sensor size, focal distance, and/or lens distortion(s), among others. A commensurate physical distance Sy along the y-axis may be expressed as $s_y = k(l)(y_p - y_n)$, where $y_p$ is the y-coordinate within the image data of the pixel at which tethered component 510 is detected, and $y_n$ is the y-coordinate within the image data of the reference position. Accordingly, the x-axis and y-axis components may be combined into a total physical distance $$s = \sqrt{s_x^2 + s_y^2}.$$

In some implementations, angle 512 may also be determined in this way in connection with the example of FIG. 5A.

In other implementations, the relationship between wind speed and position of tethered component 510 within the image data may be expressed using a predetermined mapping, which may be implemented using a look-up table and/or a regression model. For example, each pixel of the image data at which tethered component 510 could be detected may be mapped to a corresponding wind vector expected to cause such a displacement of tethered component. In some cases, each x-axis pixel coordinate may be mapped to a corresponding x-axis wind speed component, and each y-axis pixel coordinate may be mapped to a corresponding y-axis wind speed component. The x-axis and y-axis wind components may be added together to determine a total wind vector.

VII. EXAMPLE REPRESENTATION OF TETHERED COMPONENT IN IMAGE DATA

FIG. 6A illustrates an example of image data that may be captured by camera 502 and used to determine a tether-based wind vector. Specifically, image 630 includes a plurality of pixels, including pixel 632, pixel 634, and pixel 636. Pixel 632 represents a center of image 630, and may correspond to an optical axis of camera 502. Pixel 634 represents a location expected to represent tethered component 510 when (i) tethered component 510 is deployed to a particular distance beneath UAV 500 and (ii) is not acted on by any wind forces. That is, in the absence of wind, tethered component 510 would be detected at pixel 634 if deployed to the particular distance. Due to the optical center of camera 502 and the source of tether 508 being offset from one another by distance 620, different deployed lengths of tether 508 may, in the absence of wind, result in tethered component 510 being represented at different pixels of image 630.

When acted on by wind 518, tethered component 510 may be displaced from the neutral/reference position corresponding to pixel 634 and may instead be detected at pixel 636. Pixel 636 has a y-axis pixel coordinate 640 and an x-axis pixel coordinate 642. Thus, the y-axis pixel coordinate of a pixel at which tethered component 510 is detected may be indicative of a wind speed acting on tethered component 510 along the y-axis. Similarly, the x-axis pixel coordinate of the pixel at which tethered component 510 is detected may be indicative of a wind speed acting on tethered component 510 along the x-axis.

In some embodiments, the predetermined mapping may be used to determine the wind velocity based on a detection of tethered component 510 at, for example, pixel 636. The mapping may relate each x-axis pixel coordinate to a corresponding wind velocity along the x-axis and each y-axis pixel coordinate to a corresponding wind velocity along the y-axis. The relationship between pixel coordinates and wind velocity may vary as a function of the deployed length of tether 508. Thus, in order to use the mapping to determine the wind velocity, tether 508 may be deployed by a length for which a mapping has been predetermined. Stated another way, the mapping may include a plurality of sub-mappings, each of which is specific to a corresponding deployed length of tether 508.

VIII. EXAMPLE PREDETERMINED MAPPINGS

FIG. 6B shows table 650 that provides an example of a predetermined mapping between (i) horizontal pixel coordinates 652 and (ii) wind velocities 654 along the x-axis, for a corresponding deployed length of tether 508. Horizontal pixel coordinates 652 include horizontal coordinate $H_1$ (corresponding to a leftmost part of image 630) through horizontal coordinate $H_N$ (corresponding to a rightmost part of image 630) (i.e., horizontal coordinates $H_1$-$H_N$). Wind velocities 654 include wind velocity $W_1$ (corresponding to horizontal coordinate $H_1$) through wind velocity $W_N$ (corresponding to horizontal coordinate $H_N$) (i.e., wind velocities $W_1$-$W_N$). Each respective horizontal coordinate of horizontal coordinates $H_1$-$H_N$ is mapped to a corresponding wind velocity of wind velocities $W_1$-$W_N$ that causes tethered component 510 to be displaced to the respective horizontal coordinate. When the deployed length of tether 508 changes, horizontal coordinates $H_1$-$H_N$ may map to different wind velocities, and the relationship may be represented by another mapping, which may be represented using another table similar to table 650. In some cases, the mapping could instead relate (i) wind velocities 654 to (ii) an x-coordinate difference between pixel 636 and pixel 634.

Thus, the predetermined mapping could include, for each respective distance of a plurality of candidate distances to which tethered component 510 is deployable beneath the aerial vehicle, a mapping between (i) a plurality of possible x-axis positions $H_1$-$H_N$ of tethered component 510 within the image data and (ii) a plurality of possible corresponding wind velocities. Therefore, the horizontal pixel coordinate at which tethered component 510 is detected may be used to determine a corresponding wind velocity using the predetermined mapping corresponding to the respective distance to which tethered component 510 is deployed. For example, when tethered component 510 is detected at a pixel having a horizontal coordinate $H_4$, it may be determined, using table 650, that this wind-induced displacement of tethered component 510 has been caused by wind velocity $W_4$.

Similarly, FIG. 6C shows table 660 that provides an example predetermined mapping between (i) vertical pixel coordinates 662 and (ii) wind velocities 664 along the y-axis, for a corresponding deployed length of tether 508. Vertical pixel coordinates 662 include vertical coordinate $V_1$ (corresponding to a bottommost part of image 630) through vertical coordinate $V_N$ (corresponding to a topmost part of image 630) (i.e., vertical coordinates $V_1$-$V_N$). Wind velocities 664 include wind velocity $S_1$ (corresponding to vertical coordinate $V_1$) through wind velocity SN (corresponding to vertical coordinate $V_N$) (i.e., wind velocities $S_1$-$S_N$). Each respective vertical coordinate of vertical coordinates $V_1$-$V_N$ is mapped to a corresponding wind velocity of wind velocities $S_1$-$S_N$ that causes tethered component 510 to be displaced to the respective vertical coordinate. When the deployed length of tether 508 changes, vertical coordinates $V_1$-$V_N$ may map to different wind velocities, and the relationship may be represented by another mapping, which may be represented using another table similar to table 660.

In some cases, the mapping could instead relate (i) wind velocities 664 to (ii) a y-coordinate difference between pixel 636 and pixel 634.

Thus, the predetermined mapping could include, for each respective distance of a plurality of candidate distances to which tethered component 510 is deployable beneath UAV 500, a mapping between (i) a plurality of possible y-axis positions $V_1$-$V_N$ of tethered component 510 within the image data and (ii) a plurality of possible corresponding wind velocities. Therefore, the vertical pixel coordinate at which tethered component 510 is detected may be used to determine a corresponding wind velocity using the predetermined mapping corresponding to the respective distance to which tethered component 510 is deployed. For example, when tethered component 510 is detected at a pixel having a vertical coordinate $V_6$, it may be determined that this wind-induced displacement of tethered component 510 has been caused by wind velocity $S_6$.

In some implementations, the predetermined mapping may additionally or alternatively be implemented as a mathematical model (e.g., a regression model). For example, the predetermined mapping may be implemented using a polynomial function and/or a machine learning model (e.g., a neural network). The mathematical model may include one or more parameters that can be updated to tune the mathematical model to a particular physical arrangement of components of UAV 500. That is, the mathematical model may be UAV-specific and/or UAV model-specific, and may be trained based on simulated and/or empirically-measured wind speeds. Thus, in some cases, the mathematical model may account for various conditions and/or variables that may be present during physical operations but that might not be represented by some physics-based models. For example, a mathematical model trained based on empirical and/or simulation data that shows how a position of tethered component 510 varies as a result of different wind speeds may also account for the weight and drag of tether 508, which may contribute to the resulting position of tethered component 510 within the image data.

The mathematical model may be expressed as $W=f(p, l, \delta)$, where p represents the position within the image data at which tethered component 510 has been detected, l represents a length by which tether 508 has been unwound, and $\delta$ represents tunable parameters of the model (e.g., weights of the neural network). In some implementations, the predetermined mapping may be divided into two mappings (e.g., two mathematical models). For example, a first mapping may be configured to generate a physical displacement of tethered component 510 relative to the reference position based on the pixel coordinates at which tethered component 510 has been detected. The first mapping may take the form of a first mathematical model where $s_x=k(l)(x_p-x_n)$, $s_y=k(l)(y_p-y_n)$, and $$s = \sqrt{s_x^2 + s_y^2},$$

as discussed above. A second mapping may be configured to generate a wind vector based on the physical displacement $s_x$, $s_y$, and/or s of tethered component 510 relative to the reference position. The second mapping may take the form of a second mathematical model of the form $v_x=\sqrt{s_x c}$, where c is a constant that may be determined based on fitting of the second mathematical model to empirical calibration data and/or simulation data. Thus, $v_y=\sqrt{s_y/c}$, and $v=\sqrt{s/c}$, in cases where tethered component 510 is symmetric and c thus does not vary as a function of wind direction.

In some implementations, the wind vector representing properties of the wind along the x-axis and/or the y-axis may be determined based on and/or by taking into account a drag force on the tether (e.g., tether 508) due to wind (e.g., wind 508). The predetermined mapping may thus account for how different wind speeds affect both tethered component 510 and tether 508. For example, when the predetermined mapping is generated using a simulation of UAV 500, tether 508 may be assumed to be perfectly flexible and have a uniform mass per unit length, and may be modeled as a series of point masses, each of which has a corresponding drag coefficient, and cross-section facing wind 518. For each point mass, an angle of the point mass relative to UAV 500 may be individually determined based on the mass thereof, the distance thereof relative to UAV 500, the drag coefficient thereof, and the cross-section thereof. A total deflection profile of the entirety of tether 508 and/or tethered component 510 may be determined, for a given deployed tether length and given wind speed, by taking an integral of the angle of each point mass along the length of tether 508. Based on this deflection profile, a position of tethered component 510 within the image data may be determined.

IX. ADDITIONAL EXAMPLE OPERATIONS

Figure 7:
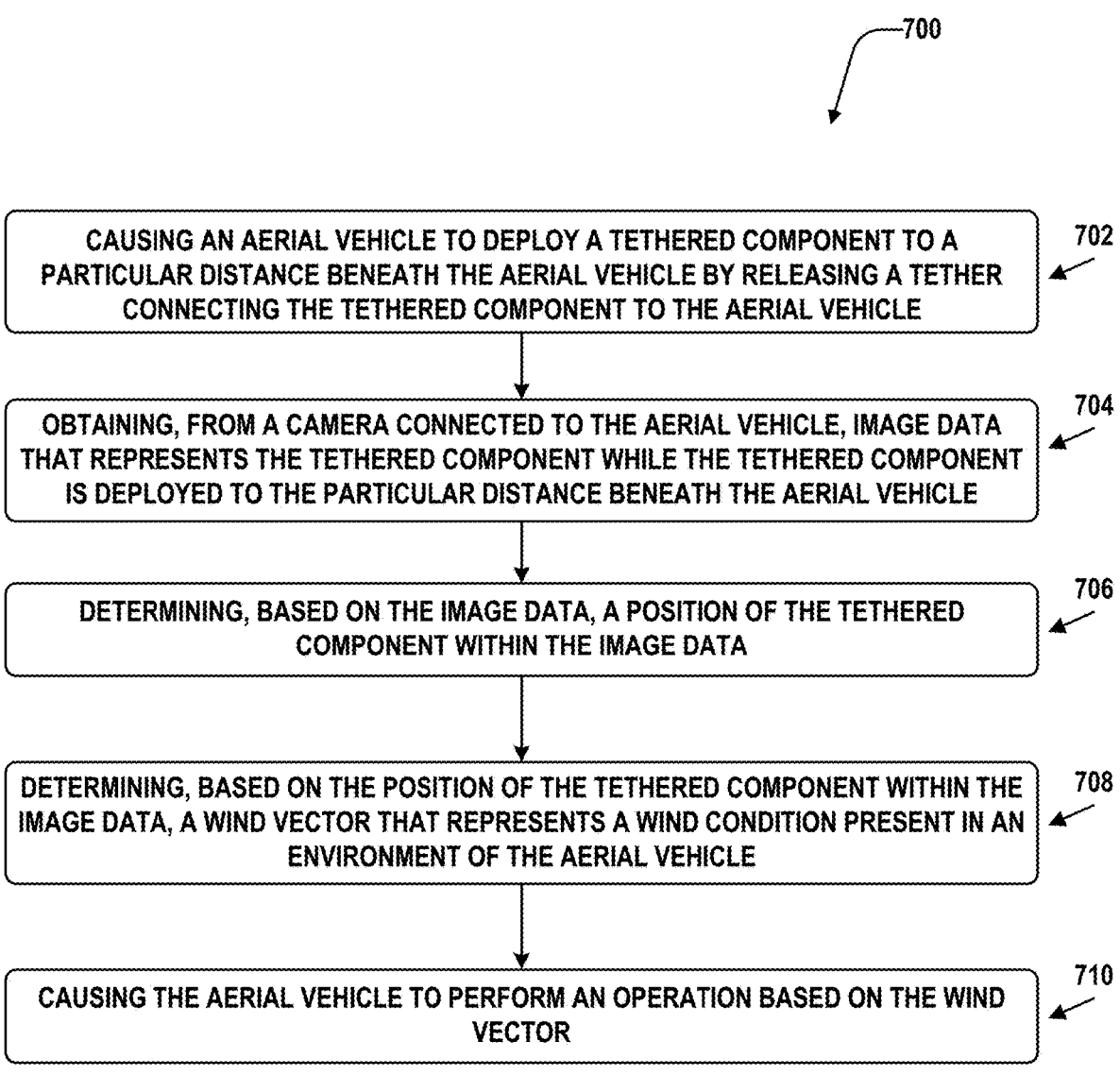
FIG. 7 illustrates a computer-implemented method of an aerial vehicle, in accordance with examples described herein.

FIG. 7 illustrates a flow chart of operations 700 related to a new technology. The operations may be carried out by various computing devices, including by UAV 100, UAV 120, UAV 140, UAV 160, UAV 180, UAV 200, distributed UAV system 300, UAV 400, and/or UAV 500, among other possibilities. The embodiments of FIG. 7 may be simplified by the removal of any one or more of the features shown therein. Further, these embodiments may be combined with features, aspects, and/or implementations of any of the previous figures or otherwise described herein.

Block 702 may involve causing an aerial vehicle to deploy a tethered component to a particular distance beneath the aerial vehicle by releasing a tether connecting the tethered component to the aerial vehicle.

Block 704 may include obtaining, from a camera connected to the aerial vehicle, image data that represents the tethered component while the tethered component is deployed to the particular distance beneath the aerial vehicle.

Block 706 may include determining, based on the image data, a position of the tethered component within the image data.

Block 708 may include determining, based on the position of the tethered component within the image data, a wind vector that represents a wind condition present in an environment of the aerial vehicle.

Block 710 may include causing the aerial vehicle to perform an operation based on the wind vector.

In some embodiments, causing the aerial vehicle to perform an operation based on the wind vector includes adjusting at least one of a position or an orientation of the aerial vehicle in the environment based on the wind vector In some embodiments, determining the wind vector includes determining a pixel distance between (i) the position of the tethered component within the image data and (ii) a reference position within the image data. The reference position is expected to represent the tethered component in the absence of wind.

In some embodiments, the wind vector represents a wind velocity and determining the wind vector includes determining a weight of the tethered component based on a mass of the tethered component, determining, based on the pixel distance, a field of view of the camera, and a resolution of the camera, a wind-induced angle formed between (i) the tethered component and (ii) a vertical line coincident with the reference position, and determining the wind velocity based on: (i) the weight of the tethered component, (ii) the wind-induced angle, (iii) a density of air in the environment, (iv) a drag coefficient of the tethered component, and (v) an area of a surface of the tethered component facing the wind vector. In some embodiments, determining the wind-induced angle further is based on the particular distance to which the tethered component is deployed beneath the aerial vehicle.

In some embodiments, the wind vector represents a wind velocity and determining the wind vector includes determining the wind velocity by selecting, from a predetermined mapping for the tethered component, the wind velocity corresponding to the particular distance and the position of the tethered component within the image data, such that the predetermined mapping comprises, for each respective distance of a plurality of distances to which the tethered component is deployable beneath the aerial vehicle, a mapping between (i) a plurality of possible positions of the tethered component within the image data and (ii) a plurality of possible wind velocities.

In some embodiments, the tethered component is a payload coupling apparatus configured to couple a payload to the tether.

In some embodiments, the tethered component has a reflective paint configured to reflect light from the tethered component towards the camera to increase a visibility of the tethered component within the image data.

In some embodiments, the tethered component includes a light emitter configured to emit light toward the camera. As such, the camera is configured to capture the image data while the light emitter emits the light towards the camera.

In some embodiments, the aerial vehicle further includes a light emitter configured to emit light toward the tethered component. As such, the camera is configured to capture the image data while the light emitter emits the light towards the tethered component.

In some embodiments, the tethered component comprises a fiducial marker disposed thereon. As such, determining the position of the tethered component within the image data includes detecting the fiducial marker within the image data.

In some embodiments, the tethered component comprises a particular shape. The tethered component may have the particular shape (e.g., diamond) along at least one side or face thereof. As such, determining the position of the tethered component within the image data includes detecting the particular shape within the image data.

In some embodiments, the particular distance beneath the aerial vehicle to which the tethered component is deployed is selected based a size of the tethered component such that the tethered component is detectable within the image data.

In some embodiments, the particular distance beneath the aerial vehicle to which the tethered component is deployed is selected based a field of view of the camera such that, when displaced by the wind vector, the tethered component is expected to be positioned within the field of view of the camera.

In some embodiments, the particular distance beneath the aerial vehicle to which the tethered component is deployed is selected based on one or more of: (i) an extent of downwash generated a propeller of the aerial vehicle, (ii) damping of the tethered component at the particular distance, or (iii) a likelihood of the tethered component, when deployed at the particular distance, striking the propeller of the aerial vehicle during movements of the aerial vehicle.

In some embodiments, the image data comprises a plurality of images captured at a plurality of different times and determining the position of the tethered component within the image data includes (i) determining, for each respective image of the plurality of images, a corresponding location of a centroid of the tethered component within the respective image, and (ii) determining, based on the corresponding location of the centroid of the tethered component within each respective image of the plurality of images, an average location of the centroid across the plurality of different times.

In some embodiments, the aerial vehicle is caused to attempt to hover in a fixed location while obtaining the image data.

In some embodiments, the image data may include a plurality of images captured at a plurality of different times. Determining the position of the tethered component within the image data may include determining, for each respective image of the plurality of images, a corresponding position of the tethered component within the respective image. Determining the wind vector may include determining a position change in the corresponding position of the tethered component across two or more images of the plurality of images and determining, based on the position change, at least one of (i) a wind speed change (e.g., a wind acceleration, properties of a wind gust) or (ii) a confidence value associated with the wind vector. Determining the position change in the corresponding position may include determining an optical flow of the corresponding position.

For example, a relatively large position change in the corresponding position of the tethered component across two or more images may be indicative of changing wind speeds, and may thus indicate a low confidence of the wind vector since the wind vector is likely to change due to the changing wind speeds. On the other hand, a relatively small position change in the corresponding position of the tethered component across two or more images may be indicative of steady wind speeds, and may thus indicate a high confidence of the wind vector since the wind vector is unlikely to change due to the steady wind speeds. For example, the wind vector may accurately represent future wind conditions when the wind speed is steady and/or stable.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
causing an aerial vehicle to deploy a tethered component to a particular distance beneath the aerial vehicle by releasing a tether connecting the tethered component to the aerial vehicle;
obtaining, from a camera connected to the aerial vehicle, a plurality of images that are captured at a plurality of different times and represent the tethered component while the tethered component is deployed to the particular distance beneath the aerial vehicle;
determining, for each respective image of the plurality of images, a corresponding location of the tethered component within the respective image;
determining, based on the corresponding location of the tethered component within each respective image of the plurality of images, an average location of the tethered component over the plurality of different times;
determining, based on the average location of the tethered component, a wind vector that represents a wind condition present in an environment of the aerial vehicle; and
causing the aerial vehicle to perform an operation based on the wind vector.

2. The computer-implemented method of claim 1, wherein determining the corresponding location of the tethered component within the respective image comprises:
determining a corresponding location of a centroid of the tethered component within the respective image.

3. The computer-implemented method of claim 1, wherein causing the aerial vehicle to perform an operation based on the wind vector comprises:
adjusting at least one of a position or an orientation of the aerial vehicle in the environment based on the wind vector.

4. The computer-implemented method of claim 1, wherein determining the wind vector comprises:
determining a pixel distance between (i) the average location of the tethered component and (ii) a reference position associated with the plurality of images, wherein the reference position is expected to represent the tethered component in the absence of wind.

5. The computer-implemented method of claim 4, wherein determining the wind vector further comprises:
determining, based on the pixel distance, a field of view of the camera, and a resolution of the camera, a wind-induced angle formed between (i) the tethered component and (ii) a vertical line coincident with the reference position; and
determining the wind vector based on the wind-induced angle and one or more of (i) a weight of the tethered component, (ii) a density of air in the environment, (iii) a drag coefficient of the tethered component, or (iv) an area of a surface of the tethered component facing the wind vector.

6. The computer-implemented method of claim 5, wherein determining the wind-induced angle comprises:
determining the wind-induced angle further based on the particular distance to which the tethered component is deployed beneath the aerial vehicle.

7. The computer-implemented method of claim 1, wherein determining the wind vector comprises:
selecting the wind vector from a predetermined mapping that corresponds to the tethered component, wherein the predetermined mapping comprises, for each respective distance of one or more distances to which the tethered component is deployable beneath the aerial vehicle, a mapping between (i) a plurality of possible positions of the tethered component within the plurality of images and (ii) a plurality of possible wind vectors.

8. The computer-implemented method of claim 7, wherein:

the predetermined mapping comprises:

a first mapping between (i) a first plurality of possible vertical positions of the tethered component within the plurality of images and (ii) a first plurality of possible wind velocities along a first axis; and a second mapping between (i) a second plurality of possible horizontal positions of the tethered component within the plurality of images and (ii) a second plurality of possible wind velocities along a second axis; and selecting the wind vector from the predetermined mapping comprises:

selecting a first wind vector component using the first mapping;

selecting a second wind vector component using the second mapping; and determining the wind vector based on the first wind vector component and the second wind vector component.

9. The computer-implemented method of claim 1, wherein the tethered component comprises a payload coupling apparatus configured to couple a payload to the tether.

10. The computer-implemented method of claim 1, wherein the tethered component comprises one or more of:

reflective paint configured to reflect light from the tethered component towards the camera to increase a visibility of the tethered component within the plurality of images;

a light emitter configured to emit light toward the camera, wherein the camera is configured to capture the plurality of images while the light emitter emits the light towards the camera;

a fiducial marker disposed on the tethered component, wherein determining the corresponding location of the tethered component within the respective image comprises detecting the fiducial marker within the respective image; or a particular shape of the tethered component, and wherein determining the corresponding location of the tethered component within the respective image comprises detecting the particular shape within the respective image.

11. The computer-implemented method of claim 1, wherein the aerial vehicle further comprises a light emitter configured to emit light toward the tethered component, and wherein the camera is configured to capture each respective image of the plurality of images while the light emitter emits the light towards the tethered component.

12. The computer-implemented method of claim 1, wherein the particular distance beneath the aerial vehicle to which the tethered component is deployed is selected based on one or more of:

a size of the tethered component such that the tethered component is detectable within the plurality of images;

a field of view of the camera such that, when displaced by the wind vector, the tethered component is expected to be positioned within the field of view of the camera;

an extent of downwash generated by a propeller of the aerial vehicle;

damping of the tethered component at the particular distance; or a likelihood of the tethered component, when deployed at the particular distance, striking the propeller of the aerial vehicle during movements of the aerial vehicle.

13. The computer-implemented method of claim 1, further comprising:

causing the aerial vehicle to attempt to hover in a fixed location while obtaining the plurality of images.

14. The computer-implemented method of claim 1, wherein determining the wind vector comprises:

determining a location change in the corresponding location of the tethered component across two or more images of the plurality of images; and determining, based on the location change, at least one of (i) a wind speed change or (ii) a confidence value associated with the wind vector.

15. A system comprising a processor configured to perform operations comprising:

causing an aerial vehicle to deploy a tethered component to a particular distance beneath the aerial vehicle by releasing a tether connecting the tethered component to the aerial vehicle;

obtaining, from a camera connected to the aerial vehicle, a plurality of images that are captured at a plurality of different times and represent the tethered component while the tethered component is deployed to the particular distance beneath the aerial vehicle;

determining, for each respective image of the plurality of images, a corresponding location of the tethered component within the respective image;

determining, based on the corresponding location of the tethered component within each respective image of the plurality of images, an average location of the tethered component over the plurality of different times;

determining, based on the average location of the tethered component, a wind vector that represents a wind condition present in an environment of the aerial vehicle; and causing the aerial vehicle to perform an operation based on the wind vector.

16. The system of claim 15, wherein determining the corresponding location of the tethered component within the respective image comprises:

determining a corresponding location of a centroid of the tethered component within the respective image.

17. The system of claim 15, wherein determining the wind vector comprises:

determining a pixel distance between (i) the average location of the tethered component and (ii) a reference position associated with the plurality of images, wherein the reference position is expected to represent the tethered component in the absence of wind.

18. A non-transitory computer-readable medium having stored thereon instructions that, when executed by a computing system, cause the computing system to perform operations comprising:

causing an aerial vehicle to deploy a tethered component to a particular distance beneath the aerial vehicle by releasing a tether connecting the tethered component to the aerial vehicle;

obtaining, from a camera connected to the aerial vehicle, a plurality of images that are captured at a plurality of different times and represent the tethered component while the tethered component is deployed to the particular distance beneath the aerial vehicle;

determining, for each respective image of the plurality of images, a corresponding location of the tethered component within the respective image;

determining, based on the corresponding location of the tethered component within each respective image of the plurality of images, an average location of the tethered component over the plurality of different times;

determining, based on the average location of the tethered component, a wind vector that represents a wind condition present in an environment of the aerial vehicle; and causing the aerial vehicle to perform an operation based on the wind vector.

19. The system of claim 17, wherein determining the wind vector further comprises:

determining, based on the pixel distance, a field of view of the camera, and a resolution of the camera, a wind-induced angle formed between (i) the tethered component and (ii) a vertical line coincident with the reference position; and determining the wind vector based on the wind-induced angle and one or more of (i) a weight of the tethered component, (ii) a density of air in the environment, (iii) a drag coefficient of the tethered component, or (iv) an area of a surface of the tethered component facing the wind vector.

20. The system of claim 15, wherein determining the wind vector comprises:

selecting the wind vector from a predetermined mapping that corresponds to the tethered component, wherein the predetermined mapping comprises, for each respective distance of one or more distances to which the tethered component is deployable beneath the aerial vehicle, a mapping between (i) a plurality of possible positions of the tethered component within the plurality of images and (ii) a plurality of possible wind vectors.

* * * * *